United States Patent
Qiu et al.

(10) Patent No.: US 12,443,463 B2
(45) Date of Patent: Oct. 14, 2025

(54) METHOD FOR SHARING RESOURCE, METHOD FOR CREATING SERVICE, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Fengzhi Qiu, Beijing (CN); Kai Zhou, Beijing (CN); Qian Wang, Beijing (CN); Quan Sun, Beijing (CN); Kai He, Beijing (CN); Heng Zhang, Beijing (CN); Guming Gao, Beijing (CN); Jing Yu, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 513 days.

(21) Appl. No.: 18/049,318

(22) Filed: Oct. 25, 2022

(65) Prior Publication Data
US 2023/0065354 A1   Mar. 2, 2023

(30) Foreign Application Priority Data
Oct. 27, 2021  (CN) .......................... 202111258020.5

(51) Int. Cl.
*G06F 9/50* (2006.01)
*G06N 3/045* (2023.01)

(52) U.S. Cl.
CPC .......... *G06F 9/5077* (2013.01); *G06F 9/5072* (2013.01); *G06N 3/045* (2023.01)

(58) Field of Classification Search
CPC ..... G06F 9/5077; G06F 9/5072; G06N 3/045; G06Q 10/00
See application file for complete search history.

(56) References Cited

U.S. PATENT DOCUMENTS

2012/0096182 A1   4/2012   Gan
2021/0144517 A1*  5/2021   Guim Bernat ........ G06F 9/5072
(Continued)

FOREIGN PATENT DOCUMENTS

CN   101207515 A   6/2008
CN   104243622 A   12/2014
(Continued)

OTHER PUBLICATIONS

"A multicast contention resolution scheme based on shared spectrum converter for elastic optical switching node;" Chongqing Municipal Commission (4 pages).

(Continued)

*Primary Examiner* — Sisley N Kim
(74) *Attorney, Agent, or Firm* — Osha Bergman Watanabe & Burton LLP

(57) ABSTRACT

A method for sharing a resource, includes: generating, by a first AI node, an association relation between the first AI node and at least one other AI node, in which the association relation is configured to generate an AI federal network; receiving, by the first AI node, resource sharing information; determining, by the first AI node, a target AI node of sharing resources with the first AI node based on the resource sharing information; determining, by the first AI node, a target resource to be shared based on the resource sharing information; and sharing, by the first AI node, the target resource with the target AI node through the AI federal network. Therefore, AI nodes realize resource sharing through the AI federal network, which is suitable for resource sharing scenarios of multiple different AI nodes and has good scalability, thereby greatly reducing the development difficulty and cost of resource sharing.

16 Claims, 8 Drawing Sheets

(56) References Cited

U.S. PATENT DOCUMENTS

| 2023/0060803 A1* | 3/2023 | Moon | H04L 9/3228 |
| 2023/0128064 A1* | 4/2023 | Wang | H04L 63/0236 |
| | | | 726/1 |
| 2023/0164241 A1* | 5/2023 | Filippou | H04L 63/08 |
| | | | 709/201 |

FOREIGN PATENT DOCUMENTS

| CN | 104796904 A | 7/2015 |
| CN | 105282196 A | 1/2016 |
| CN | 105897798 A | 8/2016 |
| CN | 105897804 A | 8/2016 |
| CN | 109800239 A | 5/2019 |
| CN | 109995878 A | 7/2019 |
| CN | 111092761 A | 5/2020 |
| CN | 111327651 A | 6/2020 |
| WO | 2020226979 A2 | 11/2020 |

OTHER PUBLICATIONS

Xiao-jian Zheng et al.; "A P2P Network Architecture Design of File Sharing System;" Computer Engineering & Software; vol. 41, No. 4; 2020 (4 pages).
Qiang Zhang, et al.; "Study of analysis of resources—sharing mechanism to P2P networks based on evolutionary game;" Computer Engineering and Applications; 2008 (4 pages).
Office Action issued for Chinese patent application 202111258020.5, mailed Jul. 17, 2023 (48 pages).
Extended European Search Report issued for European patent application 22203026.4, mailed Jan. 2, 2023 (8 pages).

* cited by examiner

METHOD FOR SHARING RESOURCE, METHOD FOR CREATING SERVICE, ELECTRONIC DEVICE, AND STORAGE MEDIUM

CROSS-REFERENCE TO RELATED APPLICATION

This application claims priority to Chinese Patent Application No. 202111258020.5, filed on Oct. 27, 2021, the content of which is hereby incorporated by reference in its entirety into this disclosure.

TECHNICAL FIELD

The disclosure relates to the field of computer technologies, especially to the field of cloud computing and cloud platform technologies, and in particular to a method for sharing a resource, a method for creating a service, an electronic device, a storage medium, and a computer program product.

BACKGROUND

Currently, with the continuous development of artificial intelligence (AI) technologies, AI-related platforms and applications have been developed, enriching people's lives and greatly improving the service processing efficiency. In the related art, there are a large number of AI-related platforms and applications. However, it is difficult to share resources among different platforms and applications.

SUMMARY

According to a first aspect of the disclosure, a method for sharing a resource is provided. The method includes: generating, by a first AI node, an association relation between the first AI node and at least one other AI node, in which the association relation is configured to generate an AI federal network; receiving, by the first AI node, resource sharing information; determining, by the first AI node, a target AI node of sharing resources with the first AI node based on the resource sharing information, in which the target AI node is any AI node in the AI federal network; determining, by the first AI node, a target resource to be shared based on the resource sharing information; and sharing, by the first AI node, the target resource with the target AI node through the AI federal network.

According to another aspect of the disclosure, a method for creating a service is provided. The method includes: receiving, by a first AI node, service creation information; obtaining, by the first AI node, service resources of a target service to be created through an AI federal network based on the service creation information; and generating, by the first AI node, the target service based on the service resources.

According to another aspect of the disclosure, an electronic device is provided. The electronic device includes: at least one processor and a memory communicatively coupled to the at least one processor. The memory stores instructions executable by the at least one processor, and when the instructions are executed by the at least one processor, the at least one processor is enabled to implement the method for sharing a resource or the method for creating a service.

According to another aspect of the disclosure, a non-transitory computer-readable storage medium for storing computer instructions is provided. The computer instructions are configured to cause a computer to implement the method for sharing a resource or the method for creating a service.

It should be understood that the content described in this section is not intended to identify key or important features of embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes embodiments of the disclosure with reference to the accompanying drawings, which includes various details of embodiments of the disclosure to facilitate understanding, and shall be considered merely exemplary. Therefore, those of ordinary skill in the art should recognize that various changes and modifications can be made to embodiments described herein without departing from the scope and spirit of the disclosure. For clarity and conciseness, descriptions of well-known functions and structures are omitted in the following description.

AI is a technical science that studies and develops theories, methods, technologies and application systems for simulating, extending and expanding human intelligence. Currently, AI technology has been widely used for advantages of high automation, high accuracy and low cost.

Cloud computing is a kind of distributed computing, which can decompose a data computing processing program into countless small programs, and process and analyze these small programs to obtain results and return the results to the user through a system composed of multiple servers, which has strong scalability and demand, so that the user can obtain unlimited resources through the network, and the resources obtained are not limited by time and space.

Cloud computing platform is a service based on hardware resources and software resources that provides computing, networking and storage capabilities. Cloud computing platform can be divided into three categories: storage cloud platform that focus on data storage, computing cloud platform that focus on data processing, and integrated cloud computing platform that combine both data storage and data processing.

Figure 1:
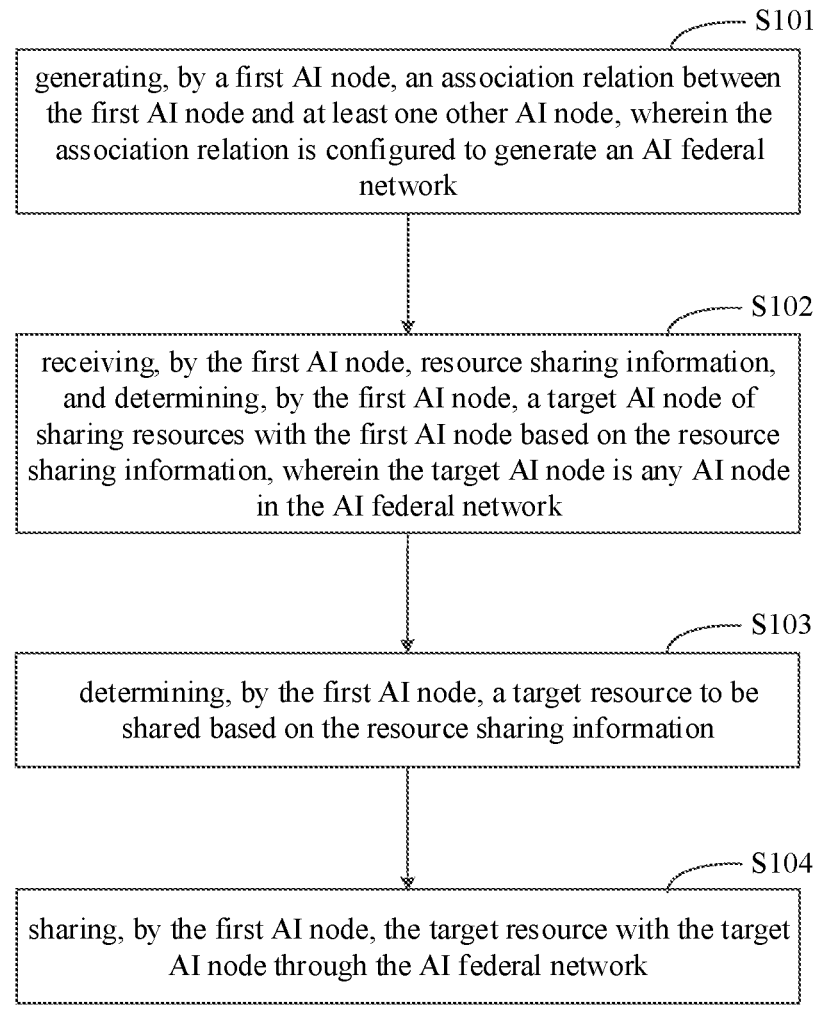
FIG. 1 is a flowchart of a method for sharing a resource according to a first embodiment of the disclosure.

FIG. 1 is a flowchart of a method for sharing a resource according to a first embodiment of the disclosure.

As illustrated in FIG. 1, the method for sharing a resource of the first embodiment of the disclosure includes the following steps.

At block S101, the first AI node generates an association relation between a first AI node and at least one other AI node, in which the association relation is configured to generate an AI federal network.

It is noted that the execution subject of the method for sharing a resource of the disclosure is a hardware device having data and information processing capabilities and/or software necessary to drive the hardware device to work. Optionally, the execution subject may include a workstation, a server, a computer, a user terminal and other intelligent devices. The user terminal includes, but is not limited to, a cell phone, a computer, an intelligent voice interaction device, a smart home appliance, a vehicle terminal, or the like.

In embodiments of the disclosure, the association relation between the first AI node and at least one other AI node is generated, and the association relation is configured to generate the AI federal network. It should be noted that types of AI nodes, and the number and types of association relations generated by the first AI node can be set according to the actual situation which is not limited herein. For example, the AI node may be a AI platform, and types of association relations may include equivalent relation and head-branch relation.

In some embodiments, the equivalent relation or the head-branch relation can be generated between any two AI nodes, and resources can be directly shared between the two AI nodes in the equivalent relation, and resources can be shared between the two AI nodes in the head-branch relation through an affiliated headquarter AI node.

In some embodiments, the AI federal network may include one or more AI federal sub-networks, each sub-network has a headquarter AI node and at least one branch AI node, and each branch AI node is affiliated to the headquarter AI node of the AI federal sub-network located by the branch AI node.

Figure 2:
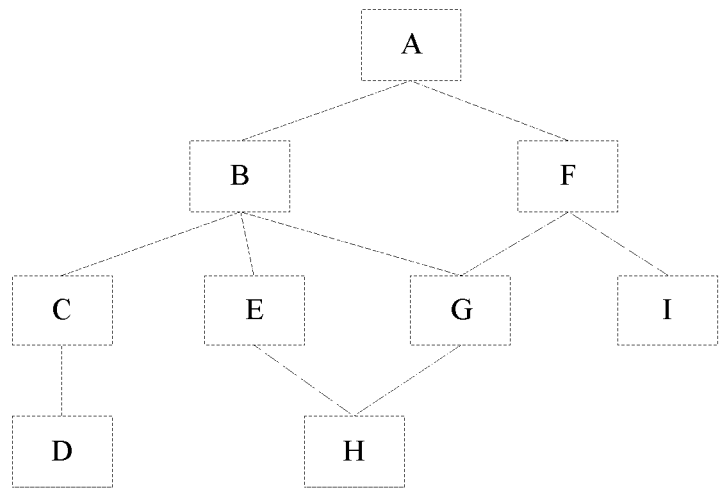
FIG. 2 is a schematic diagram of an AI federal network in a method for sharing a resource according to a second embodiment of the disclosure.

For example, as illustrated in FIG. 2, the AI federal network includes 6 AI federal sub-networks, which are AI federal sub-networks 1, 2 to 6 respectively.

The AI federal sub-network 1 includes AI nodes A, B and F, the AI node A is the headquarter AI node of the AI federal sub-network 1, and the AI nodes B and F are the branch AI nodes of the AI federal sub-network 1.

The AI federal sub-network 2 includes AI nodes B, C, E and G, the AI node B is the headquarter AI node of the AI federal sub-network 2, and the AI nodes C, E and G are the branch AI nodes of the AI federal sub-network 2.

The AI federal sub-network 3 includes AI nodes C and D, the AI node C is the headquarter AI node of the AI federal sub-network 3, and the AI node D is the branch AI node of the AI federal sub-network 3.

The AI federal sub-network 4 includes AI nodes F, G and I, the AI node F is the headquarter AI node of the AI federal sub-network 4, and the AI nodes G and I are the branch AI nodes of the AI federal sub-network 4.

The AI federal sub-network 5 includes AI nodes G and H, the AI node G is the headquarter AI node of the AI federal sub-network 5, and the AI node H is the branch AI node of the AI federal sub-network 5.

The AI federal sub-network 6 includes AI nodes E and H, the AI node E is the headquarter AI node of the AI federal sub-network 6, and the AI node H is the branch AI node of the AI federal sub-network 6.

At block S102, the first AI node receives resource sharing information, and determines a target AI node of sharing resources with the first AI node based on the resource sharing information, in which the target AI node is any AI node in the AI federal network.

It is understood that different first AI nodes may correspond to different target AI nodes.

In some embodiments, the resource sharing information carries node identification information of the target AI node, and the first AI node can determine the AI node identified based on the node identification information as the target AI node. It should be noted that the type of identification information can be set according to the actual situation, which is not limited herein. For example, the type of identification information includes but is not limited to text and character.

For example, in FIG. 2, if the first AI node is the AI node A, and the node identification information of the AI node B is carried in the resource sharing information, the AI node A can determine the target AI node of sharing resources with the AI node A as the AI node B. Moreover, if the first AI node is the AI node I, and the resource sharing information carries the node identification information of the AI node F, the AI node I can determine the target AI node of sharing resources with the AI node I as the AI node F.

In some embodiments, the first AI node may receive an operation instruction from the user, and the operation instruction carries the resource sharing information. It should be noted that the user refers to the user who can operate the AI node. For example, the user may be a user who logs in to the first AI node, or the user may be a user who logs in to other AI nodes.

In some embodiments, the first AI node may receive the resource sharing information sent by other AI nodes. For example, the first AI node may receive the resource sharing information sent by the target AI node.

At block S103, the first AI node determines a target resource to be shared based on the resource sharing information.

In embodiments of the disclosure, the resource types can be set according to the actual situation, which is not limited herein. For example, the resource types include but are not limited to models, datasets, service resources and other resources. The service resources include but are not limited to service deployment resources and service proxy resources, and the service deployment resources may include service deployment packages. It should be noted that the service resources are configured to create services on the AI node, and the types of created services can be set according to the actual situation, which is not limited herein. For example, the types of created services include but are not limited to face recognition, Optical Character Recognition (OCR), Text to Speech (TTS) and Automatic Speech Recognition (ASR).

In some embodiments, the resource sharing information carries the resource identification information of the target resource, and the first AI node may determine the resource identified by the resource identification information as the target resource.

At block S104, the first AI node shares the target resource with the target AI node through the AI federal network.

It is understood that both the first AI node and the target AI node are in the AI federal network, and a connection can be generated between the first AI node and the target AI node through the AI federal network. The connection can include direct connection and indirect connection, and the first AI node can share the target resource with the target AI node through the AI federal network.

For example, in FIG. 2, if the first AI node is the AI node A, the target AI node is the AI node B, and the AI nodes A and B are both in the AI federal sub-network 1, the AI node A can share the target resource with the AI node B through the AI federal sub-network 1.

Moreover, in FIG. 2, if the first AI node is the AI node I and the target AI node is the AI node D, the AI node I can share the target resource with the AI node D through the AI federal sub-networks 4, 1, 2, and 3.

In conclusion, according to the method for sharing a resource of embodiments of the disclosure, association relations can be generated among AI nodes, and the association relations are configured to generate the AI federal network. The AI node can determine the target AI node and the target resource based on the received resource sharing information, and share the target resource with the target AI node through the AI federal network. As a result, the AI nodes can realize resource sharing through the AI federal network, which is suitable for resource sharing scenarios of multiple different AI nodes and has good scalability, thereby greatly reducing the development difficulty and cost of resource sharing.

Figure 3:
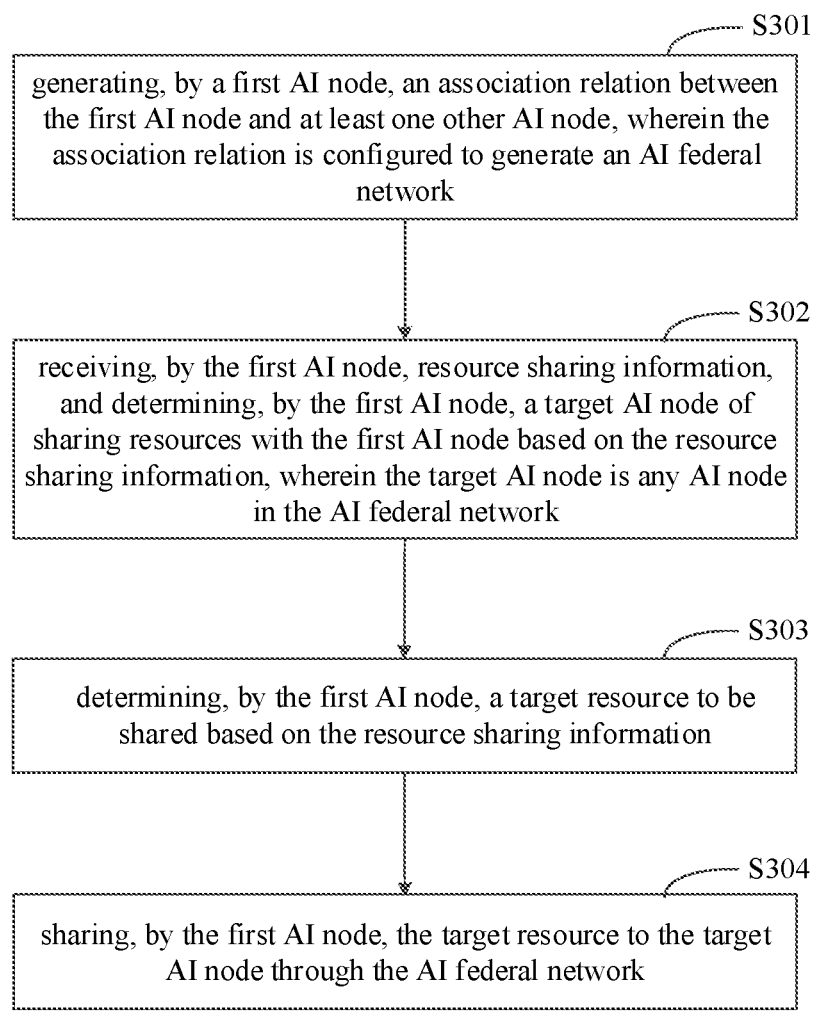
FIG. 3 is a flowchart of a method for sharing a resource according to a third embodiment of the disclosure.

FIG. 3 is a flowchart of a method for sharing a resource according to a third embodiment of the disclosure.

As illustrated in FIG. 3, the method for sharing a resource according to the third embodiment includes the following steps.

At block S301, the first AI node generates an association relation between a first AI node and at least one other AI node, in which the association relation is configured to generate an AI federal network.

At block S302, the first AI node receives resource sharing information, and determines a target AI node of sharing resources with the first AI node based on the resource sharing information, in which the target AI node is any AI node in the AI federal network.

At block S303, the first AI node determines a target resource to be shared based on the resource sharing information.

For the relevant content of steps S301-S303, reference may be made to the above embodiments, and details are not repeated herein.

At block S304, the first AI node shares the target resource to the target AI node through the AI federal network.

In some embodiments of the disclosure, the target resource is a local resource of the first AI node.

In some embodiments of the disclosure, the first AI node may obtain the target resource from the local storage space, and share the target resource to the target AI node through the AI federal network.

In some embodiments, each AI node is provided with a sharing center. The first AI node can obtain the target resource from the local sharing center.

In some embodiments, the first AI node shares the target resource to the target AI node through the AI federal network, which may include the following two possible implementations.

In the first implementation, the first AI node identifies the relation between itself and the target AI node as an equivalent relation, obtains the target resource from the local sharing center, and sends the target resource to the target AI node.

In addition, in FIG. 2, if the first AI node is the AI node B, the target AI node is the AI node F, and the relation between the AI node B and the AI node F is an equivalent relation, the AI node B can obtain the target resource from the local sharing center, and the AI Node B can send the target resource to the AI Node F.

Thus, when the relation between the first AI node and the target AI node in the method is the equivalent relation, the first AI node can directly send the target resource obtained from the local sharing center to the target AI node.

In the second implementation, the first AI node identifies the relation between itself and the target AI node as a head-branch relation. The first AI node obtains the target resource from the local sharing center, and publishes the target resource on an affiliated federal market of a headquarter AI node located by the first AI node. Branch AI nodes included in the headquarter AI node are capable of subscribing resources on the federal market, and the branch AI nodes include the target AI node.

In some embodiments of the disclosure, the headquarter AI node is provided with the federal market, the headquarter AI node and the branch AI nodes involved in it can publish resources on the federal market, and are capable of subscribing resources on the federal market.

In some embodiments, after the first AI node publishes the target resource on the affiliated federal market of the headquarter AI node, the first AI node sends a reminder message to the target AI node, in which the reminder message is configured to remind the target AI node to subscribe the target resource from the federal market of the headquarter AI node. Therefore, in this method, the first AI node can remind the target AI node to subscribe the target resource from the federal market of the headquarter AI node in time, thus a better interaction among the AI nodes is achieved.

In FIG. 2, if the first AI node is the AI node B, the target AI node is the AI node F, the relation between the AI node B and the AI node F is the head-branch relation, and the headquarter AI node to which the AI node B and the AI node F both belong is the AI node A, the AI Node B can obtain the target resource from the local sharing center and publish the target resource on the federal market 1 of the AI Node A, and the AI Node B can subscribe the target resource on the federal market 1.

Further, after the AI node B publishes the target resource on the federal market 1 of the AI node A, the AI node B can send the reminder message to the AI node F, to remind the AI node F to subscribe the target resource on the federal market 1 of the AI node A.

Thus, when the association relation between the first AI node and the target AI node in the method is the head-branch relation, the first AI node can publish the target resource obtained from the local sharing center to the federal market of the headquarter AI node, and share the target resource to the target AI node through the federal market of the headquarter AI node.

In conclusion, according to the method for sharing a resource of embodiments of the disclosure, when the target resource is the local resource of the first AI node, the first AI node can share the target resource to the target AI node through the AI federal network.

Figure 4:
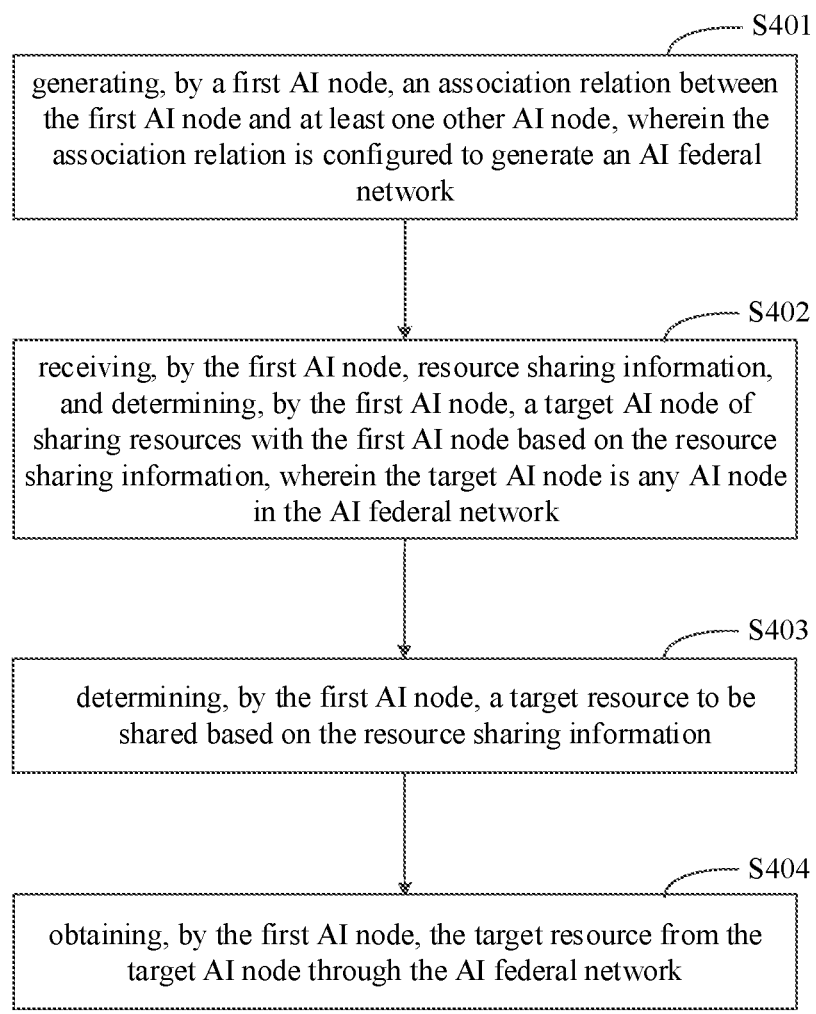
FIG. 4 is a flowchart of a method for sharing a resource according to a fourth embodiment of the disclosure.

FIG. 4 is a flowchart of a method for sharing a resource according to a fourth embodiment of the disclosure.

As illustrated in FIG. 4, the method for sharing a resource according to the fourth embodiment of the disclosure includes the following steps.

At block S401, the first AI node generates an association relation between a first AI node and at least one other AI node, in which the association relation is configured to generate an AI federal network.

At block S402, the first AI node receives resource sharing information, and determines a target AI node of sharing resources with the first AI node based on the resource sharing information, in which the target AI node is any AI node in the AI federal network.

At block S403, the first AI node determines a target resource to be shared based on the resource sharing information.

For the relevant content of steps S401-S403, reference may be made to the above embodiments, which will not be repeated herein.

At block S404, the first AI node obtains the target resource from the target AI node through the AI federal network.

In some embodiments of the disclosure, the target resource is an external resource of the first AI node.

In some embodiments of the disclosure, the first AI node can obtain the target resource from the target AI node through the AI federal network.

In some embodiments of the disclosure, after the first AI node obtains the target resource from the target AI node through the AI federal network, the first AI node stores the target resource in the local storage space to update resources in the local storage space in real time. For example, each AI node is provided with a sharing center. After the first AI node obtains the target resource from the target AI node through the AI federal network, the first AI node may also store the target resource in the local sharing center, so as to update the resources in the local sharing center in real time.

In some embodiments of the disclosure, the first AI node obtains the target resource from the target AI node through the AI federal network, which may include the following two possible implementations.

In the first implementation, the first AI node identifies the relation between itself and the target AI node as an equivalent relation, and receives the target resource sent by the target AI node.

For example, in FIG. 2, if the first AI node is the AI node B, the target AI node is the AI node F, and the relation between the AI node B and the AI node F is the equivalent relation, the AI node B can receive the target resource sent by the AI node F.

Thus, when the relation between the first AI node and the target AI node in the method is the equivalent relation, the first AI node can directly receive the target resource sent by the target AI node.

In the second implementation, the first AI node identifies the relation between itself and the target AI node as a head-branch relation, the first AI node subscribes the target resource from an affiliated federal market of a headquarter AI node located by the first AI node.

In some embodiments of the disclosure, the headquarter AI node is provided with the federal market, the headquarter AI node itself and the branch AI nodes involved in it can publish resources on the federal market, and subscribe the resources on the federal market.

In some embodiments, before the first AI node subscribes the target resource from the federal market of the headquarter AI node, it determines that the target resource does not exist in the local sharing center. Therefore, in this method, after the first AI node determines that the target resource does not exist in the local sharing center, it subscribes the target resource from the federal market of the headquarter AI node, which helps to simplify the resource sharing process.

It is understood that after the first AI node identifies that the relation between itself and the target AI node is the head-branch relation, the first AI node can determine that the target resource exists in the local sharing center, and at this time, the first AI node does not need to subscribe the target resource from the federal market of the headquarter AI node.

In some embodiments, after the first AI node subscribes the target resource from the federal market of the headquarter AI node, it can also store the target resource in the local sharing center, to update resources in the local sharing center.

In some embodiments, after the first AI node subscribes the target resource from the affiliated federal market of the headquarter AI node, the first AI node identifies itself as the headquarter AI node and publishes the target resource on the local federal market. Branch AI nodes included in the first AI node can subscribe resources on the federal market. Therefore, in this method, the first AI node can automatically publish the target resource subscribed from the federal market on the local federal market, so that real-time update of the federal market can be realized.

In FIG. 2, if the first AI node is the AI node B, the target AI node is the AI node F, the association relation between the AI node B and the AI node F is the head-branch relation, the headquarter AI node to which the AI node B and the AI node F both belong is the AI node A, and if the AI node B determines that the target resource does not exist in the local sharing center, the AI node B can subscribe the target resource from the federal market 1 of the AI node A.

After the AI node B subscribes the target resource from the federal market 1 of the AI node A, the AI node B can store the target resource in the local sharing center.

After the AI node B subscribes the target resource from the federal market 1 of the AI node A, the AI node B identifies itself as the headquarter AI node, and the AI node B publishes the target resource on the local federal market 2.

Thus, when the association relation between the first AI node and the target AI node in the method is the head-branch relation, the first AI node can subscribe the target resource from the federal market of the headquarter AI node, so that the target resource is obtained from the target AI node through the federal market of the headquarter AI node.

In conclusion, according to the method for sharing a resource of embodiments of the disclosure, when the target resource is the external resource of the first AI node, the first AI node can obtain the target resource from the target AI node through the AI federal network.

Figure 5:
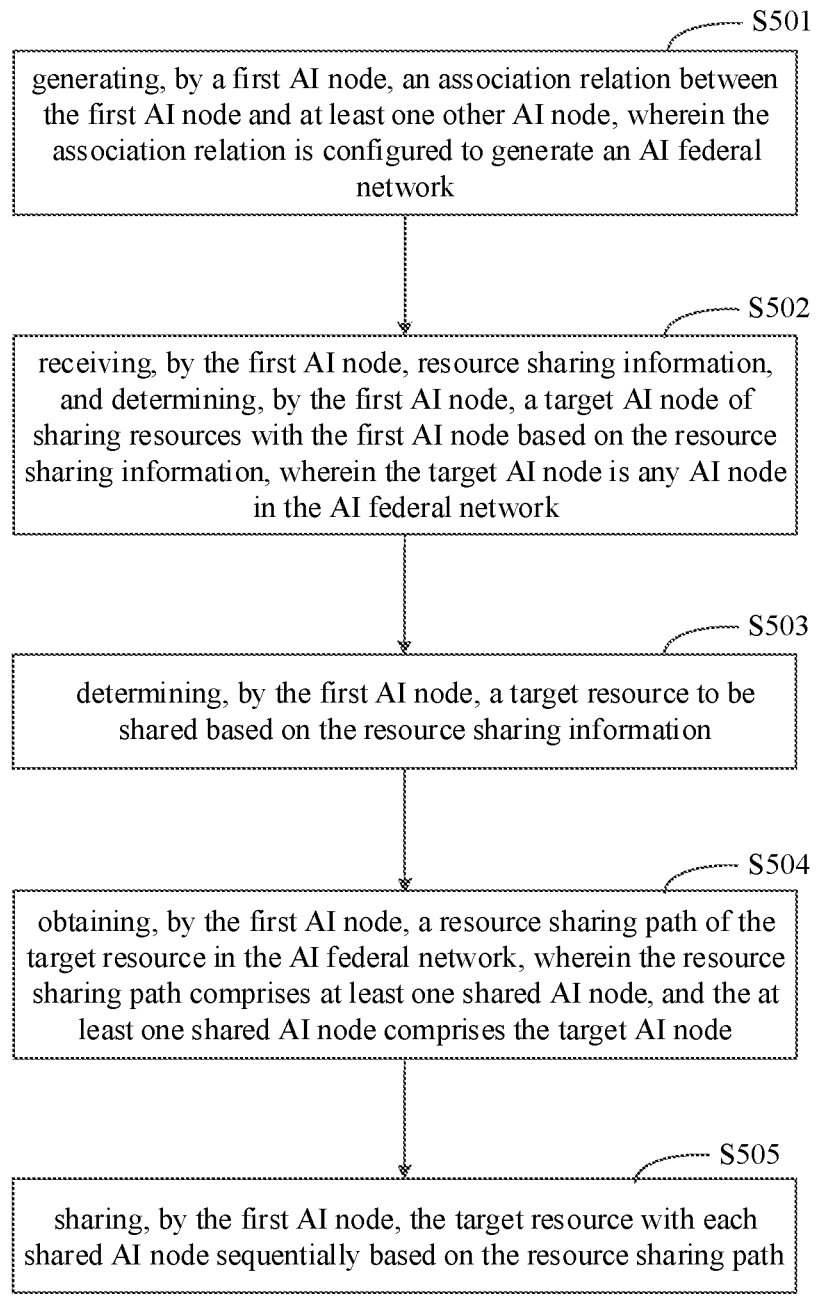
FIG. 5 is a flowchart of a method for sharing a resource according to a fifth embodiment of the disclosure.

FIG. 5 is a flowchart of a method for sharing a resource according to a fifth embodiment of the disclosure.

As illustrated in FIG. 5, the method for sharing a resource according to the fifth embodiment of the disclosure includes the following steps.

At block S501, the first AI node generates an association relation between a first AI node and at least one other AI node, in which the association relation is configured to generate an AI federal network.

At block S502, the first AI node receives resource sharing information, and determines a target AI node of sharing resources with the first AI node based on the resource sharing information, in which the target AI node is any AI node in the AI federal network.

At block S503, the first AI node determines a target resource to be shared based on the resource sharing information.

For the relevant content of steps S501-S503, reference may be made to the above embodiments, which will not be repeated herein.

At block S504, the first AI node obtains a resource sharing path of the target resource in the AI federal network, in which the resource sharing path includes at least one shared AI node, and the at least one shared AI node includes the target AI node.

In some embodiments of the disclosure, the first AI node obtains the resource sharing path of the target resource in the AI federal network. The resource sharing path includes at least one shared AI node, and the at least one shared AI node includes the target AI node. The shared AI node is any AI node in the AI federal network.

In some embodiments of the disclosure, there may be one or more shared AI nodes. When there is one shared AI node, the shared AI node only include the target AI node at this time. It is understandable that there may be duplicated shared AI nodes on the resource sharing path.

In some embodiments of the disclosure, if the target resource is the local resource of the first AI node, the target AI node is the last shared AI node on the resource sharing path.

In some embodiments of the disclosure, if the target resource is the external resource of the first AI node, the target AI node is the first shared AI node on the resource sharing path.

In some embodiments of the disclosure, when the first AI node obtains the resource sharing path of the target resource in the AI federal network, the first AI node obtains the resource sharing path based on association relations among the AI nodes in the AI federal network.

In some embodiments of the disclosure, obtaining, by the first AI node, the resource sharing path based on the association relations among the AI nodes in the AI federal network may include identifying, by the first AI node, a relation between the first AI node and the target AI node as an equivalent relation, in which the obtained shared AI node only includes the target AI node.

In some embodiments of the disclosure, obtaining, by the first AI node, the resource sharing path based on the association relations among the AI nodes in the AI federal network may include identifying, by the first AI node, a relation between the first AI node and the target AI node as a head-branch relation, in which the obtained shared AI node includes the target AI node and an affiliated headquarter AI node.

In FIG. 2, if the first AI node is the AI node B, the target AI node is the AI node F, the association relation between the AI node B and the AI node F is the equivalent relation, and the target resource is the local resource of the AI node B, then the resource sharing path of the target resource in the AI federal network are the AI nodes B and F, the shared AI node only include the AI node F, and the AI node F is the last shared AI node on the resource sharing path.

In FIG. 2, if the first AI node is the AI node B, the target AI node is the AI node F, the relation between the AI node B and the AI node F is the head-branch relation, and the headquarter AI node to which the AI node B and AI node F both belong is the AI node A, and the target resource is the local resource of the AI node B, then the resource sharing path of the target resource in the AI federal network are the AI nodes B, A, and F, and the shared AI nodes include the AI nodes A and F, and the AI node F is the last shared AI node on the resource sharing path.

In FIG. 2, if the first AI node is the AI node I, the target AI node is the AI node D, and the target resource is the local resource of the AI node I, then the resource sharing path of the target resource in the AI federal network is the AI nodes I, F, A, B, C and D, and the shared AI nodes include the AI nodes F, A, B, C and D, in which the AI node D is the last shared AI node on the resource sharing path.

In FIG. 2, if the first AI node is the AI node I, the target AI node is the AI node D, and the target resource is the external resource of the AI node I, then the resource sharing path of the target resource in the AI federal network are the AI nodes D, C, B, A, F and I. The shared AI nodes include the AI nodes D, C, B, A and F, in which the AI node D is the first shared AI node on the resource sharing path.

At block S505, the first AI node shares the target resource with each shared AI node sequentially based on the resource sharing path.

In some embodiments of the disclosure, the first AI node may share the target resource with each shared AI node sequentially based on the resource sharing path.

In some embodiments of the disclosure, the first AI node may share the target resource with the first shared AI node on the resource sharing path, and the target resource may be shared between two adjacent shared AI nodes.

In FIG. 2, if the first AI node is the AI node I, the target AI node is the AI node D, the target resource is the local resource of the AI node I, and the resource sharing path of the target resource in the AI federal network are the AI nodes I, F, A, B, C and D, then the AI node I can share the target resource with the AI node F, the AI node F can share the target resource with the AI node A, the AI node A can share the target resource with the AI node B, the AI node B can share the target resource with the AI node C, and the AI node C can share the target resource with the AI node D.

In conclusion, according to the method for sharing a resource of embodiments of the disclosure, the first AI node can obtain the resource sharing path of the target resource in the AI federal network, the shared AI node includes the target AI node, and the first AI node shares the target resource with each shared AI node sequentially based on the resource sharing path, so that the target resource can be shared with the target AI node.

Figure 6:
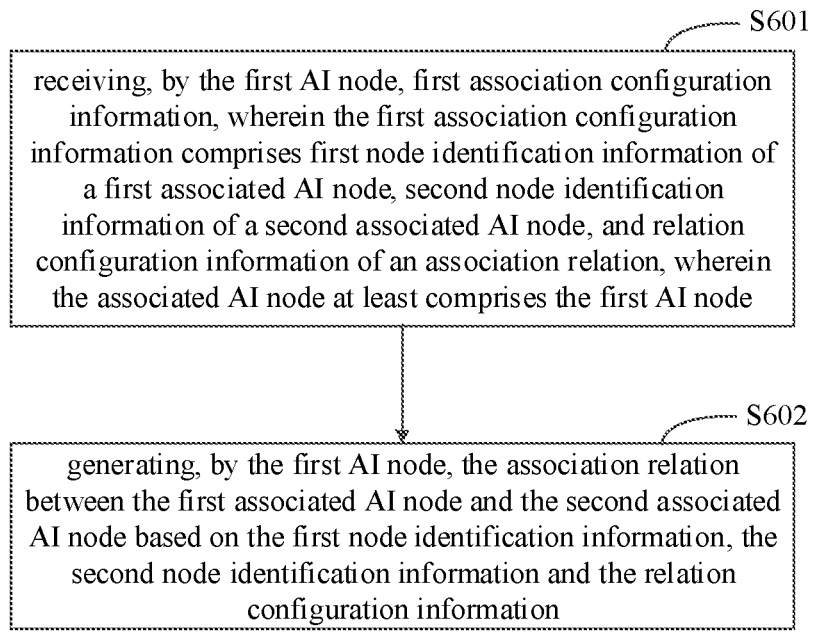
FIG. 6 is a flowchart of a method for sharing a resource according to a sixth embodiment of the disclosure.

FIG. 6 is a flowchart of a method for sharing a resource according to a sixth embodiment of the disclosure.

As illustrated in FIG. 6, the method for sharing a resource according to the sixth embodiment of the disclosure includes the following steps.

At block S601, the first AI node receives first association configuration information, in which the first association configuration information includes first node identification information of a first associated AI node, second node identification information of a second associated AI node, and relation configuration information of an association relation, in which the associated AI node at least includes the first AI node.

In some embodiments of the disclosure, the first AI node may receive the first association configuration information. The first association configuration information includes the first node identification information of the first associated AI node, and the second node identification information of the second associated AI node and the relation configuration information of the association relation, in which the associated AI node at least includes the first AI node.

In some embodiments of the disclosure, the relation configuration information includes, but is not limited to, a type of the association relation, an effective duration of the association relation and an expiration moment of the association relation, which are not limited herein.

In some embodiments of the disclosure, if the first AI node is the headquarter AI node, the associated AI nodes further includes branch AI nodes included in the first AI node itself. Therefore, in this method, when the first AI node is the headquarter AI node, the association relation among the branch AI nodes included in the first AI node can be configured.

In some embodiments of the disclosure, the first AI node may receive an operation instruction of the user. The operation instruction carries the first association configuration information. It should be noted that the user refers to the user who can operate AI nodes. For example, the user may be a user who logs in to the first AI node, or the user may be a user who logs in to other AI nodes.

In some embodiments of the disclosure, the first AI node may receive the first association configuration information sent by other AI nodes.

At block S602, the first AI node generates the association relation between the first associated AI node and the second associated AI node based on the first node identification information, the second node identification information and the relation configuration information.

In FIG. 2, if the first AI node is the AI node B, the AI node B can receive the first association configuration information. The first association configuration information includes the first node identification information of the AI node B and the second node identification information of the AI node F information and the relation configuration information of the association relation. The relation configuration information includes that the association relation is an equivalent relation. At this time, the first associated AI node is the AI node B and the second associated AI node is the AI node F, and the AI node B can generate the association relation between the AI node B and the AI node F as the equivalent relation based on the first node identification information of the AI node B, the second node identification information of the AI node F, and the relation configuration information of the association relation.

In FIG. 2, if the first AI node is the AI node A, the AI node A can receive the first association configuration information. The first association configuration information includes the first node identification information of the AI node B and the second node identification information of the AI node F and the relation configuration information of the association relation. The relation configuration information includes that the association relation is a head-branch relation. At this time, the first associated AI node is the AI node B and the second associated AI node is the AI node F, and then based on the first node identification information of the AI node B, the second node identification information of the AI node F and the relation configuration information of the association relation, the AI node A can generate the association relation between the AI node B and the AI node F as the head-branch relation.

In some embodiments of the disclosure, the first AI node may generate second association configuration information based on the first node identification information, the second node identification information and the relation configuration information, and send the second association configuration information to the associated AI node. The associated AI node includes the first associated AI node and/or the second associated AI node. Therefore, in this method, the first AI node can generate the second association configuration information, and notify the associated AI node of the second association configuration information in time, and then the associated AI node can configure its own association relation according to the second association configuration information.

In FIG. 2, if the first AI node is the AI node B, the AI node B can receive the first association configuration information. The first association configuration information includes the first node identification information of the AI node B and the second node identification information of the AI node F and the relation configuration information of the association relation. The relation configuration information includes that the association relation is an equivalent relation. At this time, the first associated AI node is the AI node B and the second associated AI node is the AI node F, and the AI node B can generate the second association configuration information based on the first node identification information of the AI node B, the second node identification information of the AI node F and the relation configuration information of the association relation, and send the second association configuration information to the AI node F.

In FIG. 2, if the first AI node is the AI node A, the AI node A can receive the first association configuration information. The first association configuration information includes the first node identification information of the AI node B and the second node identification information of the AI node F and the relation configuration information of the association relation. The relation configuration information includes that the association relation is a head-branch relation. At this time, the first associated AI node is the AI node B and the second associated AI node is the AI node F, and then the AI node A can generate the second association configuration information based on the first node identification information of the AI node B, the second node identification information of the AI node F and the relation configuration information of the association relation, and send the second association configuration information to the AI nodes B, F.

In conclusion, according to the method for sharing a resource of embodiments of the disclosure, the first AI node can receive the first association configuration information, and generates the association relationship between the first associated AI node and the second associated AI node based on the first node identification information, the second node identification information and the relation configuration information, which can realize the automatic generation of the association relation between the AI nodes.

Figure 7:
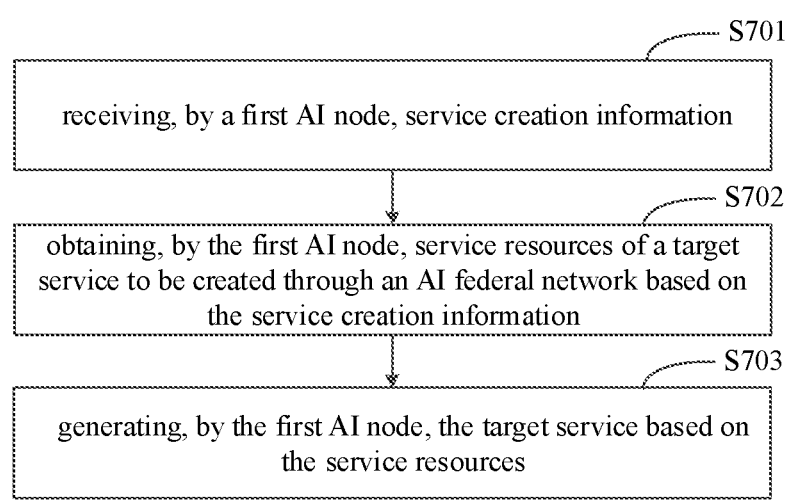
FIG. 7 is a flowchart of a method for creating a service according to a first embodiment of the disclosure.

FIG. 7 is a flowchart of a method for creating a service according to a first embodiment of the disclosure.

As illustrated in FIG. 7, the method for creating a service according to the first embodiment of the disclosure includes the following steps.

At block S701, the first AI node receives service creation information.

It should be noted that the execution subject of the method for creating a service in embodiments of the disclosure is a hardware device with data and information processing capabilities and/or necessary software for driving the hardware device to work. Optionally, the execution subject may include a workstation, a server, a computer, a user terminal and other intelligent devices. The user terminal includes, but is not limited to, a cell phone, a computer, an intelligent voice interaction device, a smart home appliance, a vehicle terminal, or the like.

In some embodiments of the disclosure, the first AI node may receive an operation instruction of the user. The operation instruction carries the service creation information. It should be noted that the user refers to the user who can operate AI nodes. For example, the user may be a user who logs in to the first AI node, or the user may be a user who logs in to other AI nodes.

In some embodiments of the disclosure, the first AI node can receive the service creation information sent by other AI nodes.

At block S702, the first AI node obtains service resources of a target service to be created through an AI federal network based on the service creation information.

In some embodiments of the disclosure, resources include service resources. It should be noted that, for the relevant content of the service resources, reference may be made to the above embodiments, and details are not repeated here.

In some embodiments of the disclosure, the service creation information carries the service identification information of the target service, and the first AI node may determine the service resources identified by the service identification information as the service resources of the target service.

In some embodiments of the disclosure, the service creation information carries the resource identification information of the service resources of the target service, and the first AI node may determine the service resources identified by the resource identification information as the service resources of the target service.

In some embodiments of the disclosure, the first AI node obtains the service resources of the target service to be created through the AI federal network according to the service creation information, which may include the following three possible implementations.

In the first implementation, the service resources of the target service are local resources, and the first AI node obtains the service resources of the target service from the local storage space according to the service creation information.

In some embodiments of the disclosure, the service information carries the resource identification information of the service resources of the target service, and the first AI node obtains the service resources identified by the resource identification information of the service resources of the target service from the local sharing center as the service resources of the target service.

In the second implementation, the service resources of the target service are external resources, the first AI node determines the target AI node storing the service resources of the target service according to the service creation information, and obtains the service resources of the target service from the target AI node through the AI federal network.

It should be noted that, for the relevant content of the service resources of the target service obtained from the target AI node through the AI federal network, reference may be made to the above embodiments, and details are not repeated here.

In some embodiments of the disclosure, the service creation information carries the resource identification information of the service resources of the target service, and the first AI node can determine the target AI node storing the service resources of the target service according to the resource identification information of the service resources of the target service.

In the third implementation, the service resources of the target service include local resources and external resources. The first AI node obtains the local resources in the service resources of the target service from the local storage space according to the service creation information, determines the target AI node that stores the external resources in the service resources of the target service according to the service creation information, and obtains the external resources in the service resources of the target service from the target AI node through the AI federal network.

At block S703, the first AI node generates the target service based on the service resources.

In some embodiments of the disclosure, generating, by the first AI node, the target service based on the service resources, includes: identifying, by the first AI node, a type of the service resources; obtaining a service creation process corresponding to the service resources based on the type of the service resources; and generating the target service according to the service creation process and the service resources. Therefore, in this method, the first AI node can consider the influence of the type of service resources on generating the service, thus the flexibility of generating the service is high.

In some embodiments of the disclosure, generating, by the first AI node, the target service based on the service resources include: determining, by the first AI node, the service resources as service deployment resources, and generating, by the first AI node, the target service based on the service deployment resources. Therefore, in this method, when the first AI node determines the service resources as the service deployment resources, it can directly generate the target service based on the service deployment resources.

In conclusion, according to the method for creating a service of embodiments of the disclosure, the first AI node can obtain the service resources of the target service to be created based on the received service creation information, and create the target service based on the service resources, which can realize the automatic creation and improve the efficiency of service creation.

Figure 8:
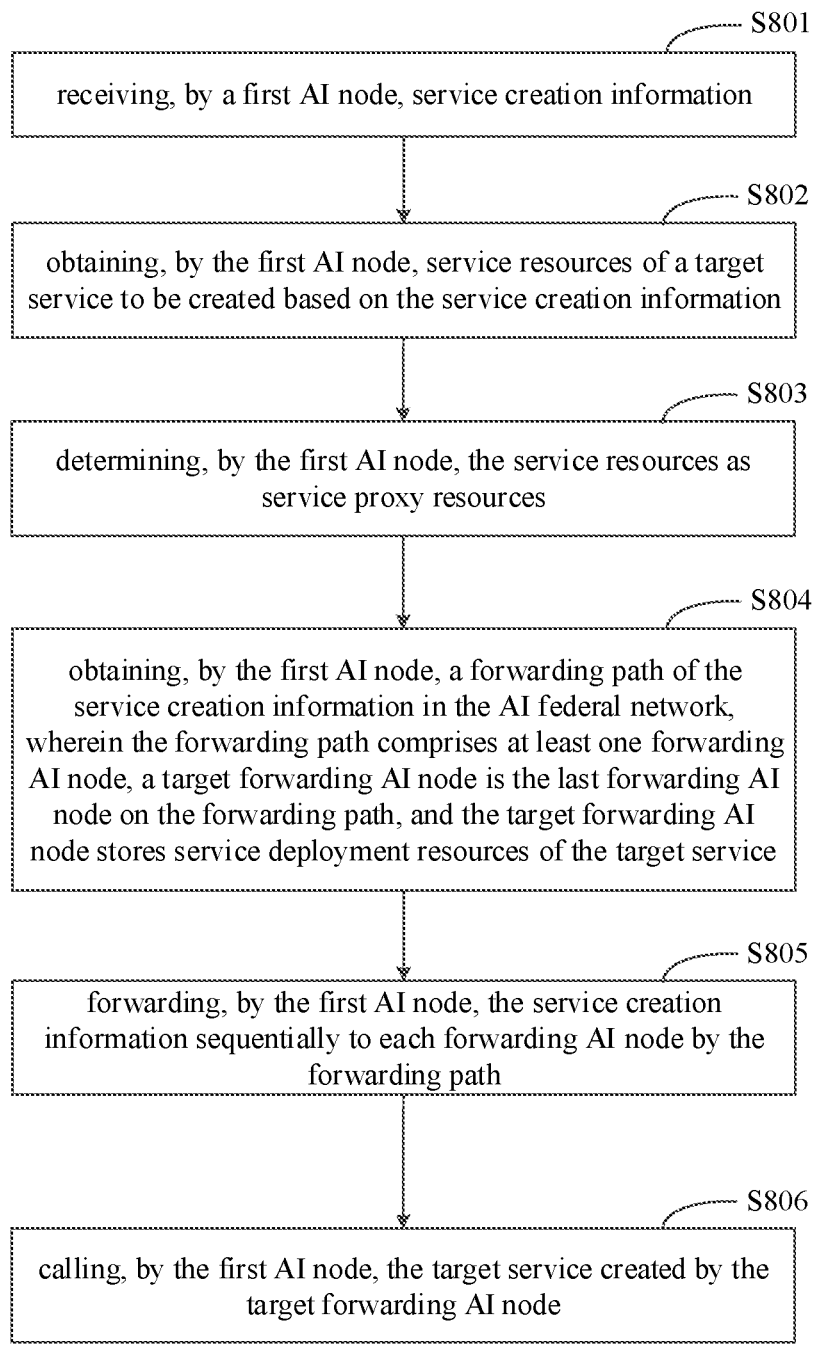
FIG. 8 is a flowchart of a method for creating a service according to a second embodiment of the disclosure.

FIG. 8 is a flowchart of a method for creating a service according to a second embodiment of the disclosure.

As illustrated in FIG. 8, the method for creating a service according to the second embodiment of the disclosure includes the following steps.

At block S801, the first AI node receives service creation information.

At block S802, the first AI node obtains service resources of a target service to be created through an AI federal network based on the service creation information.

For the relevant content of steps S801-S802, reference may be made to the above embodiments, which will not be repeated herein.

At block S803, the first AI node determines the service resources as service proxy resources.

At block S804, the first AI node obtains a forwarding path of the service creation information in the AI federal network, in which the forwarding path includes at least one forwarding AI node, a target forwarding AI node is the last forwarding AI node on the forwarding path, and the target forwarding AI node stores service deployment resources of the target service.

In some embodiments of the disclosure, when the first AI node identifies that the service resources as the service proxy resources, the forwarding path for the service creation information in the AI federal network is obtained. The forwarding path includes at least one forwarding AI node, the target forwarding AI node is the last forwarding AI node on the forwarding path, and the target forwarding AI node stores the service deployment resources of the target service. The forwarding AI node is any AI node in the AI federal network.

In some embodiments of the disclosure, there may be one or more forwarding AI nodes. When there is only one forwarding AI node, at this time, the forwarding AI node only includes the target AI node.

In some embodiments of the disclosure, obtaining, by the first AI node, the forwarding path of the service creation information in the AI federal network includes: obtaining, by the first AI node, a resource sharing path of the service proxy resources in the AI federal network, in which the resource sharing path includes at least one sharing AI node, and the target forwarding AI node is the first shared AI node on the resource sharing path, and obtaining, by the first AI node, the forwarding path based on the resource sharing path. Thus, in this method, the first AI node can obtain the forwarding path of the service creation information in the AI federal network based on the resource sharing path of the service proxy resources in the AI federal network.

It should be noted that, to obtain the relevant content of the resource sharing path of the service proxy resources in the AI federal network, reference may be made to the above embodiments, and details are not repeated here.

In some embodiments of the disclosure, obtaining, by the first AI node, the forwarding path based on the resource sharing path includes: determining, by the first AI node, a reverse path of the resource sharing path as the forwarding path.

In FIG. 2, if the first AI node is the AI node B, the target AI node is the AI node F, and the resource sharing path of the service proxy resources in the AI federal network are the AI nodes F and B, then the forwarding path of the service creation information in the AI federal network are the AI nodes B and F, the forwarding AI node only include the AI node F, and the AI node F is the last forwarding AI node on the forwarding path.

In FIG. 2, if the first AI node is the AI node B, the target AI node is the AI node F, and the resource sharing path of the service proxy resources in the AI federal network are the AI nodes F, A and B, then the forwarding path of the service creation information in the AI federal network are the AI nodes B, A and F, the forwarding AI nodes include the AI nodes A and F, and the AI node F is the last forwarding AI node on the forwarding path.

In FIG. 2, if the first AI node is the AI node D, the target AI node is the AI node I, and the resource sharing path of the service proxy resources in the AI federal network are the AI nodes I, F, A, B, C and D, then the forwarding path of the service creation information in the AI federal network includes the AI nodes D, C, B, A, F and I, the forwarding AI nodes include the AI nodes the C, B, A, F and I, and AI node I is the last forwarding AI node on the forwarding path.

In some embodiments of the disclosure, obtaining, by the first AI node, the forwarding path based on the resource sharing path includes: determining, by the first AI node, reverse paths of the resource sharing path as candidate forwarding paths; identifying duplicated forwarding AI nodes in the candidate forwarding paths; and determining the forwarding path with the shortest forwarding distance from the candidate forwarding paths.

In FIG. 2, if the first AI node is the AI node A, and the target AI node is the AI node H, the candidate forwarding path for the service creation information in the AI federal network are the AI nodes A, B, C, D, E, F, G, E, C and H, the forwarding path with the shortest distance is determined from the candidate forwarding paths as A, B, C and H.

Thus, in this method, the first AI node can determine the forwarding path with the shortest distance from the candidate forwarding paths, thus the forwarding path can be shorten, thereby reducing the numbers for forwarding the service creation information, and helping simplifying the service creation process.

At block S805, the first AI node forwards the service creation information sequentially to each forwarding AI node by the forwarding path.

In some embodiments of the disclosure, the first AI node may forward the service creation information to each forwarding AI node sequentially by the forwarding path.

In some embodiments of the disclosure, the first AI node can forward the service creation information to the first forwarding AI node on the forwarding path, and the prior forwarding AI node in the two adjacent forwarding AI nodes can forward the service creation information to the latter forwarding AI node in the two adjacent forwarding AI nodes.

In FIG. 2, if the first AI node is the AI node D, the target AI node is the AI node I, and the forwarding path of the service creation information in the AI federal network are the AI nodes D, C, B, A, F and I, then the AI node D can forward the service creation information to the AI node C, the AI node C can forward the service creation information to the AI node B, the AI node B can forward the service creation information to the AI node A, and the AI node A can forward the service creation information to the AI node F, and the AI node F may forward the service creation information to the AI node I.

At block S806, the first AI node calls the target service created by the target forwarding AI node.

In some embodiments of the disclosure, the first AI node may forward the service creation information to each forwarding AI node. Correspondingly, the forwarding AI node may receive the service creation information, obtain the service resources of the target service to be created according to the service creation information, and create the target service based on the service resources.

In some embodiments of the disclosure, the target forwarding AI node can identify the acquired service resources as service deployment resources, and generate the target service based on the service deployment resources. Correspondingly, the first forwarding node may call the target service created by the target forwarding AI node.

In conclusion, according to the method for creating a service of embodiments of the disclosure, when the first AI node identifies the service resources as the service proxy resources, it obtains the forwarding path of the service creation information in the AI federal network. The forwarding path includes the target forwarding AI node, and the target forwarding AI node stores the service deployment resources of the target service. The service creation information is forwarded to each forwarding node sequentially according to the forwarding path, and the target service created by the target forwarding AI node may be called. Thus, the first AI node can forward the service creation information to the target forwarding AI node storing the service deployment resources, and call the target service created by the target forwarding AI node, so as to realize the automatic creation of the service.

In the technical solutions of the disclosure, collection, storage, use, processing, transmission, provision and disclosure of the user's personal information involved are all in compliance with relevant laws and regulations, and do not violate public order and good customs.

Figure 9:
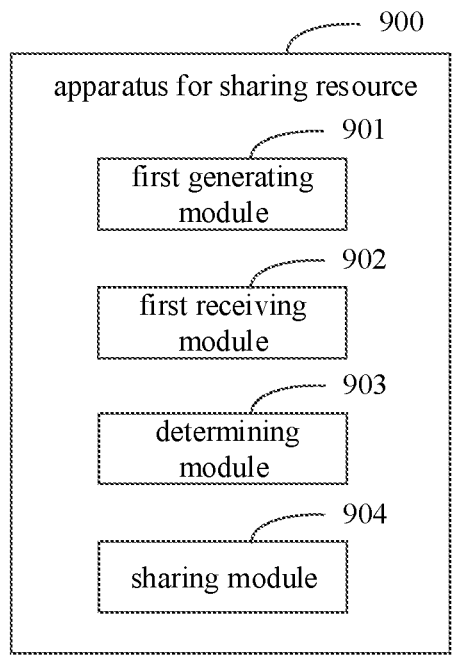
FIG. 9 is a block diagram of an apparatus for sharing a resource according to a first embodiment of the disclosure.

FIG. 9 is a block diagram of an apparatus for sharing a resource according to a first embodiment of the disclosure.

As illustrated in FIG. 9, the apparatus 900 for sharing a resource of embodiments of the disclosure includes: a first generating module 901, a first receiving module 902, a determining module 903 and a sharing module 904.

The first generating module 901 is configured to generate an association relation between a first AI node and at least one other AI node, in which the association relation is configured to generate an AI federal network.

The first receiving module 902 is configured to receive resource sharing information, and determine a target AI node of sharing resources with the first AI node based on the resource sharing information, in which the target AI node is any AI node in the AI federal network.

The determining module 903 is configured to determine a target resource to be shared based on the resource sharing information.

The sharing module 904 is configured to share the target resource with the target AI node through the AI federal network.

In some embodiments of the disclosure, the sharing module 904 is further configured to: in response to the target resource being a local resource, share the target resource to the target AI node through the AI federal network; or in response to the target resource being an external resource, obtain the target resource from the target AI node through the AI federal network.

In some embodiments of the disclosure, the sharing module 904 is further configured to: identify a relation between the first AI node and the target AI node as an equivalent relation, obtain the target resource from a local sharing center, and send the target resource to the target AI node; or identify a relation between the first AI node and the target AI node as a head-branch relation, obtain the target resource from a local sharing center, and publish the target resource on an affiliated federal market of a headquarter AI node located by the first AI node, in which branch AI nodes included in the headquarter AI node are capable of subscribing resources on the federal market, and the branch AI nodes include the target AI node.

In some embodiments of the disclosure, the apparatus 900 for sharing a resource further includes a reminder module, configured to send a reminder message to the target AI node, in which the reminder message is configured to remind the target AI node to subscribe the target resource from the federal market of the headquarter AI node.

In some embodiments of the disclosure, the sharing module 904 is further configured to: identify a relation between the first AI node and the target AI node as an equivalent relation, and receive the target resource sent by the target AI node; or identify a relation between the first AI node and the target AI node as a head-branch relation, and subscribe the target resource from an affiliated federal market of a headquarter AI node located by the first AI node.

In some embodiments of the disclosure, the apparatus 900 for sharing a resource further includes: a first storage module, configured to store the target resource in a local sharing center.

In some embodiments of the disclosure, the apparatus 900 for sharing a resource further includes: a second storage module, configured to identify the first AI node as the headquarter AI node, and publish the target resource on a local federal market, in which branch AI nodes included in the first AI node is capable of subscribing resources on the federal market.

In some embodiments of the disclosure, before subscribing, by the first AI node, the target resource from the affiliated federal market of the headquarter AI node located by the first AI node, the sharing module 904 is further configured to: determine that the target resource does not exist in a local sharing center.

In some embodiments of the disclosure, the apparatus 900 for sharing a resource further includes: a third receiving module and a second generating module. The third receiving module is configured to: receive first association configuration information, in which the first association configuration information includes first node identification information of a first associated AI node, second node identification information of a second associated AI node, and relation configuration information of an association relation, and the associated AI node at least includes the first AI node. The second generating module is further configured to: generate the association relation between the first associated AI node and the second associated AI node based on the first node identification information, the second node identification information and the relation configuration information.

In some embodiments of the disclosure, the apparatus 900 for sharing a resource further includes: a response module configured to in response to the node type of the first AI node being the headquarter AI node, include branch AI nodes included in the headquarter AI node as the associated AI s.

In some embodiments of the disclosure, the apparatus 900 for sharing a resource further includes: a generating module, configured to generate second association configuration information based on the first node identification information, the second node identification information and the relation configuration information; and a sending module, configured to send the second association configuration information to the associated AI node.

In conclusion, in the apparatus for sharing a resource of embodiments of the disclosure, the association relation can be generated among the AI nodes, and the association relation is configured to generate the AI federal network. The AI node can determine the target AI node and the target resource based on the received resource sharing information, and share the target resource with the target AI node through the AI federal network. As a result, AI nodes can realize resource sharing through the AI federal network, which is suitable for resource sharing scenarios of multiple different AI nodes and has good scalability, thereby greatly reducing the development difficulty and cost of resource sharing.

Figure 10:
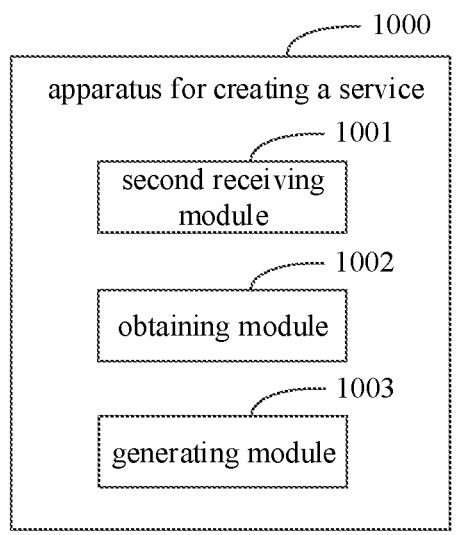
FIG. 10 is a block diagram of an apparatus for creating a service according to a first embodiment of the disclosure.

FIG. 10 is a block diagram of an apparatus for creating a service according to a first embodiment of the disclosure.

As illustrated in FIG. 10, the apparatus 1000 for creating a service of embodiments of the disclosure includes: a second receiving module 1001, an obtaining module 1002 and a generating module 1003.

The second receiving module 1001 is configured to receive service creation information.

The obtaining module 1002 is configured to obtain service resources of a target service to be created through an AI federal network based on the service creation information.

The generating module 1003 is configured to generate the target service based on the service resources.

In some embodiments of the disclosure, the generating module 1003 is further configured to: determine the service resources as service deployment resources; and generate the target service based on the service deployment resources.

In some embodiments of the disclosure, the generating module 1003 is further configured to: determine the service resources as service proxy resources; obtain a forwarding path of the service creation information in the AI federal network, in which the forwarding path includes at least one forwarding AI node, a target forwarding AI node is the last forwarding AI node on the forwarding path, and the target forwarding AI node stores service deployment resources of the target service; forward the service creation information sequentially to each forwarding AI node by the forwarding path; and call the target service created by the target forwarding AI node.

In some embodiments of the disclosure, the generating module 1003 is further configured to: obtain a resource sharing path of the service proxy resources in the AI federal network, in which the resource sharing path includes at least one sharing AI node, and the target forwarding AI node is the first shared AI node on the resource sharing path; and obtain the forwarding path based on the resource sharing path.

In conclusion, with the apparatus for creating a service of embodiments of the disclosure, the first AI node can obtain the service resources of the target service to be created based on the received creation service information, and create the target service based on the service resources, which can realize automatic service creation and improve the efficiency of service creation.

According to embodiments of the disclosure, the disclosure provides an electronic device, a readable storage medium and a computer program product.

Figure 11:
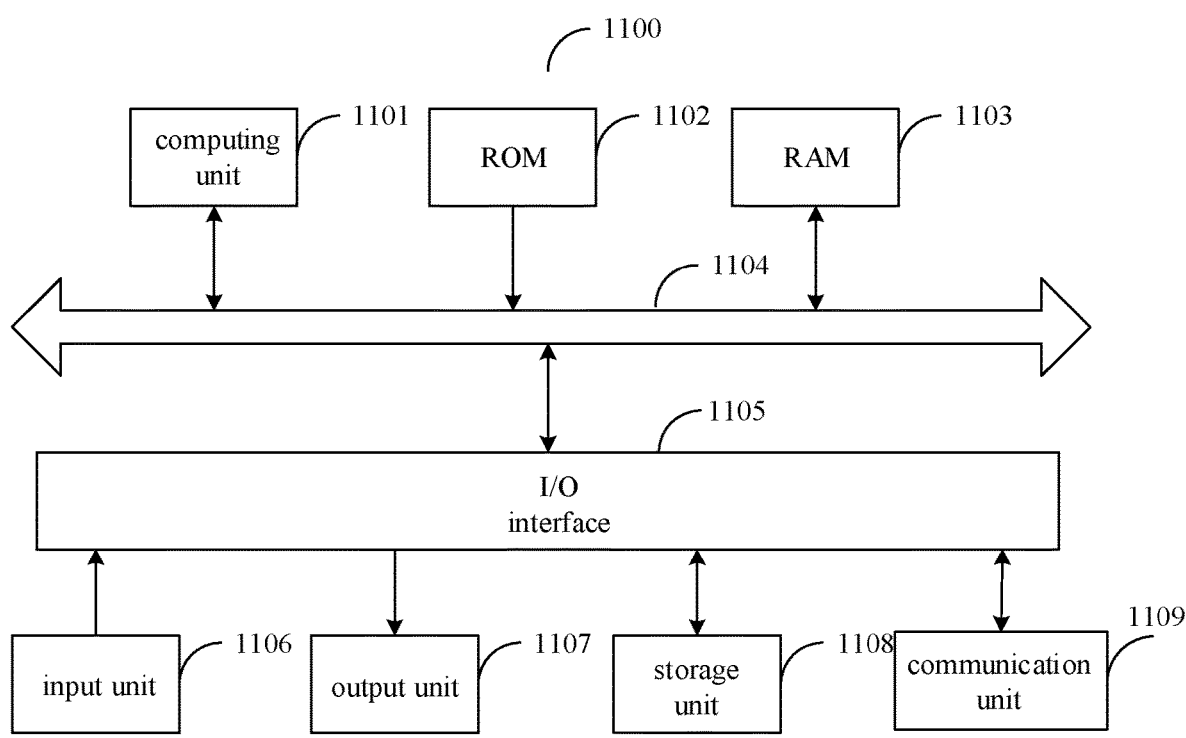
FIG. 11 is a block diagram of an electronic device used to implement a method for sharing a resource and/or a method for creating a service according to embodiments of the disclosure.

FIG. 11 is a block diagram of an example electronic device 1100 used to implement embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 11, the electronic device 1100 includes: a computing unit 1101 performing various appropriate actions and processes based on computer programs stored in a read-only memory (ROM) 1102 or computer programs loaded from the storage unit 1108 to a random access memory (RAM) 1103. In the RAM 1103, various programs and data required for the operation of the device 1100 are stored. The computing unit 1101, the ROM 1102, and the RAM 1103 are connected to each other through a bus 1104. An input/output (I/O) interface 1105 is also connected to the bus 1104.

Components in the device 1100 are connected to the I/O interface 1105, including: an inputting unit 1106, such as a keyboard, a mouse; an outputting unit 1107, such as various types of displays, speakers; a storage unit 1108, such as a disk, an optical disk; and a communication unit 1109, such as network cards, modems, and wireless communication transceivers. The communication unit 1109 allows the device 1100 to exchange information/data with other devices through a computer network such as the Internet and/or various telecommunication networks.

The computing unit 1101 may be various general-purpose and/or dedicated processing components with processing and computing capabilities. Some examples of computing unit 1101 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1101 executes the various methods and processes described above, such as the method for sharing a resource and the method for creating a service. For example, in some embodiments, the method for sharing a resource and the method for creating a service may be implemented as a computer software program, which is tangibly contained in a machine-readable medium, such as the storage unit 1108. In some embodiments, part or all of the computer program may be loaded and/or installed on the device 1100 via the ROM 1102 and/or the communication unit 1109. When the computer program is loaded on the RAM 1103 and executed by the computing unit 1101, one or more steps of the method for sharing a resource and the method for creating a service described above may be executed. Alternatively, in other embodiments, the computing unit 1101 may be configured to perform the method for sharing a resource and the method for creating a service in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

According to embodiments of the disclosure, the disclosure also provides a computer program product including computer programs. When the computer programs are executed by a processor, the steps of the method for sharing a resource or the method for creating a service described in the foregoing embodiments of the disclosure are implemented.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those of ordinary skill in the art should understand that various modifications, combinations, sub-combinations and substitutions can be made according to design requirements and other factors. Any modification, equivalent replacement and improvement made within the spirit and principle of this application shall be included in the protection scope of this application.

The invention claimed is:

1. A method for sharing a resource, comprising:
generating, by a first artificial intelligence, AI, node, an association relation between the first AI node and at least one other AI node, wherein the association relation is configured to generate an AI federal network;
receiving, by the first AI node, resource sharing information;
determining, by the first AI node, a target AI node of sharing resources with the first AI node based on the resource sharing information, wherein the target AI node is any AI node in the AI federal network;
determining, by the first AI node, a target resource to be shared based on the resource sharing information; and
sharing, by the first AI node, the target resource with the target AI node through the AI federal network.

2. The method of claim 1, wherein sharing, by the first AI node, the target resource with the target AI node through the AI federal network, comprises:
in response to the target resource being a local resource, sharing, by the first AI node, the target resource to the target AI node through the AI federal network; or
in response to the target resource being an external resource, obtaining, by the first AI node, the target resource from the target AI node through the AI federal network.

3. The method of claim 2, wherein sharing, by the first AI node, the target resource to the target AI node through the AI federal network, comprises:
identifying, by the first AI node, a relation between the first AI node and the target AI node as an equivalent relation, obtaining, by the first AI node, the target resource from a local sharing center, and sending, by the first AI node, the target resource to the target AI node; or
identifying, by the first AI node, a relation between the first AI node and the target AI node as a head-branch relation, obtaining, by the first AI node, the target resource from a local sharing center, and publishing, by the first AI node, the target resource on an affiliated federal market of a headquarter AI node located by the first AI node, wherein branch AI nodes included in the headquarter AI node are capable of subscribing resources on the federal market, and the branch AI nodes comprise the target AI node.

4. The method of claim 3, further comprising:
sending, by the first AI node, a reminder message to the target AI node, wherein the reminder message is configured to remind the target AI node to subscribe the target resource from the federal market of the headquarter AI node.

5. The method of claim 2, wherein obtaining, by the first AI node, the target resource from the target AI node through the AI federal network, comprises:
identifying, by the first AI node, a relation between the first AI node and the target AI node as an equivalent relation, and receiving, by the first AI node, the target resource sent by the target AI node; or
identifying, by the first AI node, a relation between the first AI node and the target AI node as a head-branch relation, and subscribing, by the first AI node, the target resource from an affiliated federal market of a headquarter AI node located by the first AI node.

6. The method of claim 5, further comprising:
storing, by the first AI node, the target resource in a local sharing center.

7. The method of claim 5, further comprising:
identifying, by the first AI node, the first AI node as the headquarter AI node; and
publishing, by the first AI node, the target resource on a local federal market, wherein branch AI nodes included in the first AI node are capable of subscribing resources on the federal market.

8. The method of claim 5, further comprising:
   determining, by the first AI node, that the target resource does not exist in a local sharing center.

9. The method of claim 1, wherein sharing, by the first AI node, the target resource with the target AI node through the AI federal network, comprises:
   obtaining, by the first AI node, a resource sharing path of the target resource in the AI federal network, wherein the resource sharing path comprises at least one shared AI node, and the at least one shared AI node comprises the target AI node; and
   sharing, by the first AI node, the target resource with each shared AI node sequentially based on the resource sharing path.

10. The method of claim 1, further comprising:
    receiving, by the first AI node, first association configuration information, wherein the first association configuration information comprises first node identification information of a first associated AI node, second node identification information of a second associated AI node, and relation configuration information of an association relation, wherein the associated AI node at least comprises the first AI node; and
    generating, by the first AI node, the association relation between the first associated AI node and the second associated AI node based on the first node identification information, the second node identification information and the relation configuration information.

11. The method of claim 10, further comprising:
    generating, by the first AI node, second association configuration information based on the first node identification information, the second node identification information and the relation configuration information; and
    sending, by the first AI node, the second association configuration information to the associated AI node.

12. An electronic device, comprising:
    a processor, and
    a memory communicatively coupled to the processor; wherein,
    the memory is configured to store instructions executable by the processor, and when the instructions are executed by the processor, the processor is configured to:
    generate, by a first artificial intelligence, AI, node, an association relation between the first AI node and at least one other AI node, wherein the association relation is configured to generate an AI federal network;
    receive, by the first AI node, resource sharing information;
    determine, by the first AI node, a target AI node of sharing resources with the first AI node based on the resource sharing information, wherein the target AI node is any AI node in the AI federal network;
    determine, by the first AI node, a target resource to be shared based on the resource sharing information; and
    share, by the first AI node, the target resource with the target AI node through the AI federal network.

13. The device of claim 12, wherein the processor is configured to:
    in response to the target resource being a local resource, share, by the first AI node, the target resource to the target AI node through the AI federal network; or
    in response to the target resource being an external resource, obtain, by the first AI node, the target resource from the target AI node through the AI federal network.

14. The device of claim 13, wherein the processor is configured to:
    identify, by the first AI node, a relation between the first AI node and the target AI node as an equivalent relation, obtain, by the first AI node, the target resource from a local sharing center, and send, by the first AI node, the target resource to the target AI node; or
    identify, by the first AI node, a relation between the first AI node and the target AI node as a head-branch relation, obtain, by the first AI node, the target resource from a local sharing center, and publish, by the first AI node, the target resource on an affiliated federal market of a headquarter AI node located by the first AI node, wherein branch AI nodes included in the headquarter AI node are capable of subscribing resources on the federal market, and the branch AI nodes comprise the target AI node.

15. The device of claim 14, wherein the processor is configured to:
    send, by the first AI node, a reminder message to the target AI node, wherein the reminder message is configured to remind the target AI node to subscribe the target resource from the federal market of the headquarter AI node.

16. A non-transitory computer-readable storage medium having computer instructions stored thereon, wherein the computer instructions are configured to cause a computer to implement the method of claim 1.

* * * * *